United States Patent
Kang et al.

(10) Patent No.: US 9,286,406 B2
(45) Date of Patent: Mar. 15, 2016

(54) APPARATUS AND METHOD FOR GENERATING UNIQUE ID OF RF CARD

(71) Applicant: TOUCH WORKS INC., Seoul (KR)

(72) Inventors: Seung Hun Kang, Seoul (KR); Hyung Soon Park, Goyang-si (KR); Sung Hwan Roh, Seoul (KR); Jun Chae Na, Seoul (KR)

(73) Assignee: TOUCH WORKS INC. (KR)

( * ) Notice: Subject to any disclaimer, the term of this patent is extended or adjusted under 35 U.S.C. 154(b) by 0 days.

(21) Appl. No.: 14/427,771

(22) PCT Filed: Aug. 26, 2013

(86) PCT No.: PCT/KR2013/007631
§ 371 (c)(1),
(2) Date: May 14, 2015

(87) PCT Pub. No.: WO2014/042365
PCT Pub. Date: Mar. 20, 2014

(65) Prior Publication Data
US 2015/0324475 A1    Nov. 12, 2015

(30) Foreign Application Priority Data
Sep. 14, 2012 (KR) .................. 10-2012-0102016

(51) Int. Cl.
| | | |
|---|---|---|
| *G06K 5/00* | (2006.01) | |
| *G06F 17/30* | (2006.01) | |
| *G06K 7/10* | (2006.01) | |
| *H04W 4/00* | (2009.01) | |

(52) U.S. Cl.
CPC ...... *G06F 17/30876* (2013.01); *G06K 7/10297* (2013.01); *H04W 4/008* (2013.01)

(58) Field of Classification Search
CPC .......... G06K 5/00; G06K 7/08; G06K 19/00; G06K 19/08; G06F 17/00
USPC .................. 235/380, 487, 492, 451, 375, 440
See application file for complete search history.

(56) References Cited

U.S. PATENT DOCUMENTS

| | | | |
|---|---|---|---|
| 7,929,642 B2 | 4/2011 | Kim | |
| 7,961,078 B1 * | 6/2011 | Reynolds | ........... G06K 7/10297 340/10.2 |
| 2004/0164170 A1 | 8/2004 | Krygier et al. | |

(Continued)

FOREIGN PATENT DOCUMENTS

| | | |
|---|---|---|
| KR | 1020020033698 | 5/2002 |
| KR | 1020050027377 | 3/2005 |

(Continued)

OTHER PUBLICATIONS

International Search Report—PCT/KR2013/007631 dated Nov. 27, 2013.

*Primary Examiner* — Edwyn Labaze
(74) *Attorney, Agent, or Firm* — Cantor Colburn LLP

(57) ABSTRACT

A unique ID generation apparatus that may generate a unique ID of a radio frequency (RE) card includes a card recognition unit that recognizes an RF card; a command transmission unit that transmits, to the recognized RF card, a plurality of commands which respectively correspond to a plurality of RF protocols; a response reception unit that receives, from the RF card, responses to one or more of the plurality of commands; and a unique ID generation unit that generates a unique ID of the RF card based on the received responses.

15 Claims, 7 Drawing Sheets

(56) References Cited

U.S. PATENT DOCUMENTS

| | | | | |
|---|---|---|---|---|
| 2007/0235537 A1* | 10/2007 | Yoneda | G06F 13/102 | |
| | | | 235/435 | |
| 2010/0026454 A1* | 2/2010 | Rowse | G06K 7/0008 | |
| | | | 340/10.1 | |
| 2013/0194075 A1* | 8/2013 | Dressel | G06K 19/0723 | |
| | | | 340/10.1 | |
| 2013/0201007 A1* | 8/2013 | Hillan | H04B 5/0062 | |
| | | | 340/10.2 | |

FOREIGN PATENT DOCUMENTS

| | | |
|---|---|---|
| KR | 1020060044197 | 5/2006 |
| KR | 1020060109308 | 10/2006 |
| KR | 1020090007825 | 1/2009 |
| KR | 1020100022475 | 3/2010 |

\* cited by examiner

APPARATUS AND METHOD FOR GENERATING UNIQUE ID OF RF CARD

TECHNICAL FIELD

The embodiments described herein pertain generally to an apparatus and a method for generating a unique ID of a radio frequency (RE) card.

BACKGROUND

An enterprise or a store that provides goods or services issues a coupon or a membership card to a client, and provides various services such as point reserve, price discount, and free service provision. However, in the coupon or membership card service of the related art, since a user gets coupons or membership cards of all stores that the user does business with, there is the inconvenience that the user always has several membership cards.

Meanwhile, in order to solve the inconvenience, a method of reserving points by printing a QR code or a barcode on a purchase receipt and capturing the printed QR code or barcode, a method of storing point information in a user terminal or an IC chip memory of a card, or a method of associating a credit card with an electronic stamp have been suggested. However, there are inconveniences that the QR code is captured or an application is installed. Thus, there is a need for a method of reserving and managing points conveniently and effectively. With regard to a method of providing reserve points to a user, Korean Patent Publication No. 2002-0033698 describes reserve point system and method using a non-contact card.

DISCLOSURE OF THE INVENTION

Problems to be Solved by the Invention

Example embodiments provide services such as point reserve, discount, and free service provision by using a radio frequency (RE) card possessed by the user without issuing a new membership, installing a service applet to the card, or installing an application. Example embodiments also generate unique identification information in order to ensure the uniqueness of the RF card. However, the technical problems to be solved by the example embodiments are not limited to the technical problems described above, and other technical problems may be present.

Means for Solving the Problems

In an aspect of example embodiments, there is provided a unique ID generation apparatus that generates a unique ID of a radio frequency (RE) card. The apparatus includes: a card recognition unit that recognizes an RF card; a command transmission unit that transmits, to the recognized RF card, a plurality of commands which respectively correspond to a plurality of RF protocols; a response reception unit that receives, from the RF card, a response to one or more of the plurality of commands; and a unique ID generation unit that generates a unique ID of the RF card based on the received responses.

In another aspect of example embodiments, there is provided an identification information generating method for generating a unique ID of a radio frequency (RE) card. The method includes: recognizing an RF card; transmitting, to the recognized RF card, a plurality of commands which respectively correspond to a plurality of RF protocols; receiving, from the RF card, a response to one or more of the plurality of commands; and generating a unique ID of the RF card based on the received responses.

In still another aspect of example embodiments, there is provided a unique ID generation apparatus that generates a unique ID of a radio frequency (RE) card. The apparatus includes: a response information reception unit that receives response information of an RF card from an RF-card recognition apparatus; a unique ID generation unit that generates a unique ID of the RF card based on the received response information; and a service providing unit that executes a service process corresponding to the RF card based on the generated unique ID.

Effect of the Invention

In accordance with the example embodiments, a user can use one card possessed by the user as a united identification card. A unique ID that ensures the uniqueness of a radio frequency (RE) card of the user can be generated based on a response from the RF card. The RF card of the user can be recognized among a plurality of cards which is manufactured according to different RF communication protocols, or by different RF chip manufacturers, different RF card developers or different RF card issuers. The user can further conveniently use various services such as point reserve and discount by using the RF card of the user without issuing a new card, installing a separate service applet or installing a new application.

MODE FOR CARRYING OUT THE INVENTION

Figure 1:
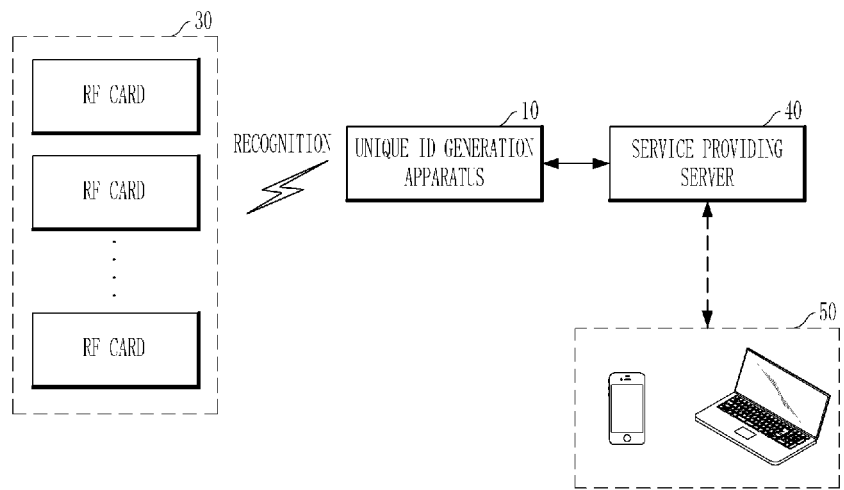
FIG. 1 is a configuration diagram of a unique ID generation system according to an example embodiment of the present disclosure.

Hereinafter, example embodiments of the present disclosure will be described in detail with reference to the accompanying drawings so as to allow those skilled in the art to easily implement the present disclosure. However, the present disclosure may be realized in various forms, and is not limited to the example embodiments described herein. In order to clearly describe the present disclosure, the parts that are not related to the description will be omitted in the drawings, and throughout the specification, similar components will be assigned similar reference numerals.

In the specification, when one part is "connected" to another part, these parts may be "directly connected" to each other, or may be "electrically connected" to each other with a third device interposed therebetween. When one part "includes" other components, one part may further include other components but does not exclude other components, unless the context clearly indicates otherwise.

FIG. 1 is a configuration diagram of a unique ID generation system according to an example embodiment of the present disclosure. Referring to FIG. 1, the unique ID generation system includes a unique ID generation apparatus 10, a plurality of RF (Radio Frequency) cards 30, a service providing server 40, and terminals 50. Here, since the unique ID generation system of FIG. 1 is merely an example embodiment of the present disclosure, the present disclosure is not interpreted as being limited to the components of FIG. 1, and various applications are possible from the components of FIG. 1.

The terminals 50 may be realized as mobile terminals that can access a remote server via a network. Here, the mobile terminals may be mobile communication devices having portability and mobility, and may include, for example, all kinds of hand-held wireless communication devices such as a PCS (Personal Communication System), a GSM (Global System for Mobile communication (GSM), a PDC (Personal Digital Cellular), a PHS (Personal Handy-phone System), a PDA (Personal Digital Assistance), an IMT (International Mobile Telecommunication)-2000, a CDMA (Code Division Multiple Access)-2000, a W-CDMA (W-Code Division Multiple Access), a Wibro (Wireless Broadband Internet) terminal, a smart phone, a smart pad, and a table PC. Further, the terminal 50 may be a device that supports NFC (Near Field Communication), or a device such as a PC that can be connected via a network. The form of the terminal 50 illustrated in FIG. 1 is merely an example for the sake of convenience in the description, and the kind and form of the terminal 50 described in the present disclosure are not interpreted as being limited to those of the terminal shown in FIG. 1.

The network refers to a connection structure in which information can be exchanged between nodes such as a plurality of terminals and servers, and may include networks such as the Internet, a LAN (Local Area Network), a wireless LAN (Local Area Network), a WAN (Wide Area Network), a PAN (Personal Area Network), and a mobile radio communication network, but is not limited thereto.

The RF card 30 is a non-contact card that transmits and receives information using an RF, and may be a card that supports RF communication protocols such as MIFARE, ISO 14443 Type A, ISO 14443 Type B, and FeliCa. Furthermore, an example of the RF card 30 may include an IC (Integrated Circuit) chip, a card having an IC chip stored therein, a Combi-USIM (Universal Subscriber Identity Module), and a device including a NFC (Near Field Communication) controller. Moreover, the RF card 30 may be referred to as a PICC (Proximity IC Card), or may be a typical RF card. The form of the RF card 30 is merely an example for the sake of convenience in the description, but is not limited thereto.

In general, since the RF card 30 is manufactured and distributed for a specific system, or a specific purpose and service, the RF card may be normally used in only the corresponding system. For example, an access card of a certain enterprise may be used in only a place related to the corresponding enterprise, and may not have a function such as payment of bus or subway fare. As another example, a transportation card may be used to pay fare when using public transportation. In this case, data included in the transportation card may be arbitrarily operated without authority granted by a certain system.

The service providing server 40 may provide various services corresponding to the RF cards 30. For example, the service providing server 40 may provide a membership service, a mileage service, a coupon reserve service, services that provide additional benefits by being associated with multiple stores in a local commercial area, a telephone-number alert service, an online order/payment service, a ticket service, a social commerce coupon service, a store visit check-in service, and an attendance check service for a certain reunion using the RF cards 30.

The service providing server 40 may provide, for example, services that provide advertisements based on telephone number information associated with the RF card 30, and may provide a service that inputs telephone number information corresponding to the RF card 30 when a user uses the RF card 30 to issue a receipt for cash payment, and a service that sends notice and confirm messages to telephone number information of a parent or a guardian interworking with the RF card 30 when a child uses the RF card 30. In addition, the service providing server 40 may provide various services described above to an entrepreneur who frequently moves or an entrepreneur in a traditional market who has no separate affiliated-store terminal through a terminal such as a smart phone that supports NFC (Near Field Communication). However, the present disclosure is not limited to the examples described above.

The service providing server 40 may receive user information including E-mail information and telephone number information of the user in order to associate the RF card 30 with the user. In this case, the service providing server 40 may receive the user information from the terminal 50 of a certain store, or may directly receive the user information from the terminal of the user that supports NFC.

The service providing server 40 may transmit information regarding a service associated with the RF card 30 to the terminal of the user or the terminal 50 of the certain store. The service providing server 40 may transmit the information regarding the service by using a method such as a SMS (Short Message Service), a MMS (Multimedia Message Service), or an E-mail, or may transmit the information regarding the service by using a PUSH message through an application. The information regarding the service may be directly checked by which the user accesses a web page by using the terminal 50. An example of the information regarding a service includes mileage information, point information, available coupon information, and any event information.

The unique ID generation apparatus 10 may recognize the RF card 30. In this case, the RF card 30 may support different RF communication protocols depending on systems in use. Furthermore, two or more RF cards 30 that support the same RF communication protocol may include chips of different manufacturers. The unique ID generation apparatus 10 may recognize various RF cards 30 described above.

The unique ID generation apparatus 10 may transmit a plurality of commands that respectively corresponds to a plurality of RF protocols to the recognized radio RF card 30, and may receive responses to at least one or more commands of the plurality of commands from the RF card 30. For example, the unique ID generation apparatus 10 may transmit or receive information in response to different commands according to a protocol standard supported by the RF card 30.

In other words, the unique ID generation apparatus 10 may transmit different commands to the RF card 30 that supports the ISO 14443 Type A protocol, the RF card 30 that supports the ISO 14443 Type B protocol, and the RF card 30 that supports the FeliCa protocol. The unique ID generation apparatus 10 may receive responses corresponding to commands transmitted to various types of recognized RF cards 30.

The unique ID generation apparatus 10 may generate a unique ID of the RF card 30 based on the received responses. For example, the unique ID generation apparatus 10 may generate the unique ID of the RF card 30 by combining the plurality of responses received according to the ISO 14443 Type A protocol. The unique ID may be means appropriate to recognize the RF card 30.

In general, the RF card 30 may have an ID in a manufacturing process. Here, the ID is a value given according to a protocol standard, and may include a different ID depending on a system that issues and manages the RF card 30. For example, different types of IDs may be used depending on a manufacturer of the RF card 30, an IC chip manufacturer, a chip OS developer, or a card issuer. In addition, when an ID in accordance with any one protocol is issued, since an ID that has been already issued according to the other protocol is not inquired, a plurality of RF cards 30 having the same ID may be present. For this reason, it is very difficult to collectively manage IDs of all types of RF cards 30 by one system, and it is difficult to practically recognize the RF card 30 using the ID. By contrast, the unique ID generation apparatus 10 may generate a unique ID for recognizing the RF card 30 irrespective of the ID that is independently given depending on the manufacturer of the RF card 30, the IC chip manufacturer, the chip OS developer, or the card issuer. As described above, the unique ID may be means appropriate to recognize the RF card 30.

The respective components of FIG. 1 will be described in detail with reference to the drawings.

Figure 2:
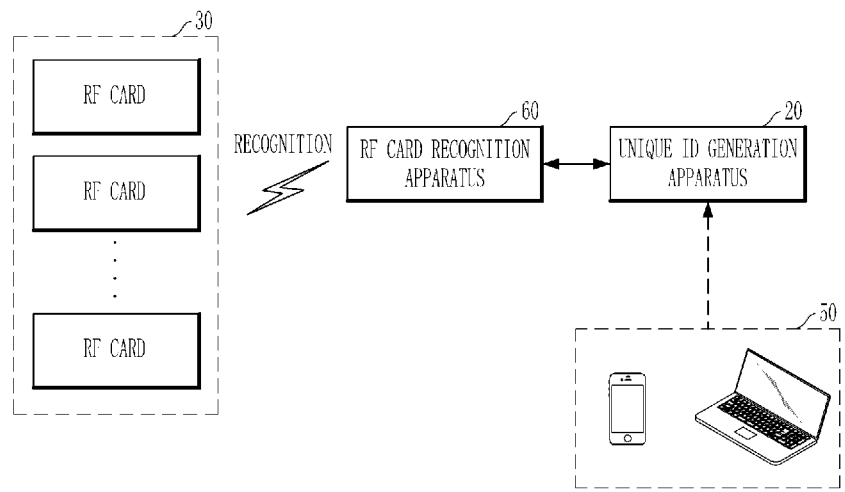
FIG. 2 is a configuration diagram of a unique ID generation system according to another example embodiment of the present disclosure.

FIG. 2 is a configuration diagram of a unique ID generation system according to another example embodiment of the present disclosure. Referring to FIG. 2, the unique ID generation system includes a unique ID generation server 20, a plurality of RF cards 30, an RF-card recognition apparatus 60 that is separately provided, and a terminal 50. In this case, the description of the plurality of RF cards 30 and the terminal 50 illustrated in FIG. 2 is the same as that of the plurality of RF cards 30 and the terminal 50 illustrated in FIG. 1 or is easily analogized by those skilled in the art from the above description, and thus, the description thereof will be omitted. The unique ID generation server 20 illustrated in FIG. 2 performs all operations of the unique ID generation apparatus 10 and the service providing server 40 illustrated in FIG. 1, and the description of the unique ID generation server 20 that is not be mentioned below will be replaced with the description of the unique ID generation apparatus 10 and the service providing server 40 of FIG. 1.

The RF-card recognition apparatus 60 may be various apparatuses that can communicate with the RF card 30 according to the corresponding protocol, and may be terminals provided with an NFC controller. The RF-card recognition apparatus 60 may be a typical RF reader, and the RF reader may generally refer to a PCD (Proximity Coupling Device). However, the RF-card recognition apparatus is not limited to the apparatuses described above, and various types of RF-card recognition apparatuses 60 may be present.

The unique ID generation server 20 may receive response information of the RF card 30 from the RF-card recognition apparatus 60, and may generate the unique ID of the RF card 30 based on the received response information. For example, the unique ID generation server 20 may receive response information of the RF card 30 corresponding to the ISO 14443 Type B protocol from the RF reader, and may generate the unique ID based on the received response information.

The unique ID generation server 20 may execute a service process corresponding to the RF card 30 based on the generated unique ID. For example, the unique ID generation server 20 may provide data regarding a certain mileage to the RF card 30 corresponding to the generated unique ID.

The operation of the unique ID generation server 20 will be described in detail with reference to FIG. 4.

Figure 3:
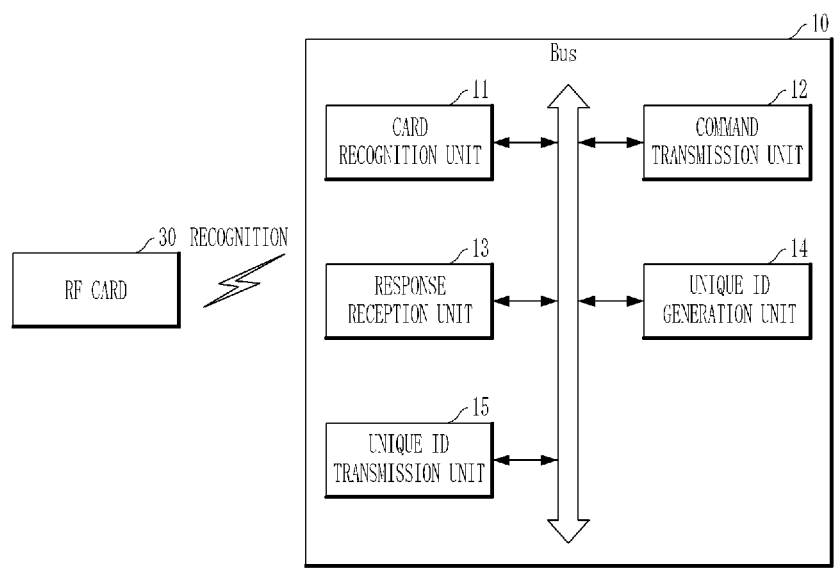
FIG. 3 is a configuration diagram of a unique ID generation apparatus shown in FIG. 1 according to the example embodiment of the present disclosure.

FIG. 3 is a configuration diagram of the unique ID generation apparatus 10 illustrated in FIG. 1 according to the example embodiment of the present disclosure. Referring to FIG. 3, the unique ID generation apparatus 10 that generates the unique ID of the RF card 30 includes a card recognition unit 11, a command transmission unit 12, a response reception unit 13, a unique ID generation unit 14, and a unique ID transmission unit 15.

The card recognition unit 11 may recognize the RF card 30. For example, the card recognition unit 11 may recognize the RF card 30 that supports communication protocols such as MIFARE, ISO 14443 Type A, ISO 14443 Type B, and FeliCa, or various RF cards 30 that simultaneously support a plurality of protocols such as Mifare and ISO 14443 Type A.

The command transmission unit 12 may transmit a plurality of commands which respectively corresponds to a plurality of RF protocols to the recognized RF card 30. For example, the command transmission unit 12 may transmit a plurality of commands including a REQA (Request A) command, a WUPA (Wake-UP A) command, a REQB (Request B) command, a WUPB (Wake-UP B) command, a Polling command, an ANTICOLLISTION command, a SELECT command, a RATS (Request for Answer to Select) command and a plurality of APDU (Application Protocol Data Unit) commands which are defined according to the plurality of protocols to the recognized RF card 30.

The command transmission unit 12 may transmit a first command corresponding to a first RF protocol to the RF card 30, and a second command corresponding to a second RF protocol to the RF card. As one example, the command transmission unit 12 may transmit commands such as REQA, WUPA, SELECT, and RATS (Request for Answer To Select) corresponding to the ISO 14443 Type A protocol to the RF card 30, may transmit commands such as REQB, WUPB, and SELECT corresponding to the ISO 14443 Type B protocol to the RF card 30, and may transmit a command such as Polling corresponding to the Felica protocol to the RF card 30.

The command transmission unit 12 may transmit a first type command and a second type command to the RF card 30. Here, the first type command may be the Polling command for detecting the RF card 30, and the second type command may be the SELECT command. When receiving a response to the first type command by the response reception unit 13, the command transmission unit 12 may transmit the second type command to the RF card 30. For example, when transmitting the REQA command corresponding to the polling command of the ISO 14443 Type A protocol to the RF card 30 and receiving a response to the REQA command by the response reception unit 13, the command transmission unit 12 may transmit the ANTICOLLISION command and the SELECT command which is a selection command to the RF card 30.

The command transmission unit 12 may transmit a first polling command of a plurality of polling commands which corresponds to the first RF protocol to the RF card 30, and may transmit a second polling command thereof which corresponds to the second RF protocol to the RF card 30. The first polling command may include at least one or more commands of the REQA command and the WUPA command, and the second polling command may include at least one or more commands of the REQB command and the WUPB command. When receiving a response to the first polling command by the response reception unit 13, the command transmission unit 12 may transmit the SELECT command to the RF card 30. As one example, the command transmission unit 12 may transmit the REQA command which is a polling command that supports the Mifare protocol, the ISO 14443 Type A protocol, or both protocols to the RF card 30, may transmit the REQB command which is a polling command of the ISO 14443 Type B protocol to the RF card 30, and may transmit a Polling command which is a polling command of the Felica protocol to the RF card 30. When receiving a response to the REQA command by the response reception unit 13, the command transmission unit 12 may transmit the ANTICOLLISION command and the SELECT command to the RF card 30.

The command transmission unit 12 may transmit the REQA command corresponding to the first RF protocol, the WUPA command corresponding to the first RF protocol, the REQB command corresponding to the second RF protocol, the WUPB command corresponding to the second RF protocol, and the polling command corresponding to a third RF protocol. When receiving a response to the REQA command or the WUPA command corresponding to the first RF protocol by the response reception unit 13, the command transmission unit 12 may transmit the selection command corresponding to the first RF protocol to the RF card 30.

The response reception unit 13 may receive responses to at least one or more commands of a plurality of commands from the RF card 30. For example, the response reception unit 13 may receive responses to a ATQA (Answer To Request, Type A) command, a ATQB (Answer To Request, Type B) command, a UID (Unique Identifier) command, a SAK (Select AcKnowledge, Type A), a ATS (Answer To Select) command, and a plurality of APDU commands from the RF card 30, as the responses to the plurality of transmitted commands.

The response reception unit 13 may receive a response to the first type command and a response to the second type command. As one example, the response reception unit 13 may receive the ATQA as a response to the REQA or WUPA command, or may receive the SAK as a response to the SELECT command.

The response reception unit 13 may receive the ID of the RF card given in the manufacturing process of the recognized RF card 30. For example, the response reception unit 13 may receive the UID of the recognized RF card 30, as the response to the ANTICOLLISION command of the ISO 14443 Type A protocol. As another example, the response reception unit 13 may receive a PUPI (Pseudo-Unique PICC Identifier) of the recognized RF card 30, as the response to the ANTICOLLISION command of the ISO 14443 Type B protocol. As still another example, the response reception unit 13 may receive an IDm (Manufacture ID of acquired System) or a PMm (Manufacture Parameter of acquired System) of the Felica protocol.

The unique ID generation unit 14 may generate the unique ID of the RF card 30 based on the received responses. For example, in the case of the ISO 14443 Type A protocol, the unique ID generation unit 14 may generate the unique ID of the RF card 30 by combining the ATQA as the response to the REQA command, the UID as the response to the ANTICOLLISION command and the SAK as the response to the SELECT command. The unique ID generation unit 14 may generate the unique ID of the RF card 30 by further including the ATS as the response to the RATS command and the responses to the plurality of APDU commands.

When receiving a first response corresponding to a first command from the RF card 30, the unique ID generation unit 14 may generate an ID corresponding to the first RF protocol as the unique ID of the RF card, and when receiving a second response corresponding to a second command, the unique ID generation unit may generate an ID corresponding to the second RF protocol as the unique ID of the RF card. As one example, when receiving the ATQA corresponding to the REQA command, the unique ID generation unit 14 may generate a unique ID corresponding to the ISO 14443 Type A protocol, as the unique ID of the RF card 30, and when receiving the ATQB corresponding to the REQB command, the unique ID generation unit may generate a unique ID corresponding to the ISO 14443 Type B protocol as the unique ID of the RF card 30. Alternatively, when receiving the response to the command of the Felica protocol, the unique ID generation unit may generate a unique ID corresponding to the Felica protocol as the unique ID of the RF card 30.

The unique ID generation unit 14 may determine a first part of the unique ID by using the response to any one of the first polling command and the second polling command, may determine a second part of the unique ID based on the response to the selection command, and may generate the unique ID by combining the determined first part and the determined second part. For example, the unique ID generation unit 14 may determine the ATQA as the response to the REQA command which is the polling command of the ISO 14443 Type A protocol, as the first part of the unique ID, may determine the UID as the response to the ANTICOLLISION command and the SAK as the response to the SELECT command, as the second part of the unique ID, and may generate the unique ID by combining the ATQA, the UID and the SAK. If necessary, the unique ID generation unit may generate the unique ID by further including the responses to the ATS and APDU commands.

The unique ID generation unit 14 may generate the unique ID of the RF card 30 based on the received responses and the received ID. The ID received from the RF card 30 may have a different size (byte) depending on the protocol. For example, in the case of the Mifare protocol and the ISO 14443 Type A protocol, the unique ID generation unit 14 may generate the unique ID based on the UID having a size of 4 bytes, 7 bytes or 10 bytes depending on the RF card, and in the case of the ISO 14443 Type B protocol, the unique ID generation unit may generate the unique ID based on the UID which includes a PUPI (Pseudo-Unique PICC Identifier, application data and Protocol Infor and has a size of 11 bytes. In the case of the Felica protocol, the unique ID generation unit may generate the unique ID of the RF card 30 based on the UID which includes the IDm (Manufacture ID of acquired System) and the PMm (Manufacture Parameter of acquired System) and has a size of 16 bytes.

The unique ID generation unit 14 may generate a code that may include at least one or more of numbers and characters and that is generated by combining at least one or more responses of the plurality of responses received by the response reception unit 13 as the unique ID that recognizes the RF card 30. As one example, the unique ID generation unit may generate s predetermined code generated by combining at least one or more responses of the plurality of responses including the ATQA, the ATQB, the UID, the SAK and the ATS received by the response reception unit 13, as the unique ID.

The unique ID generation unit 14 may encrypt the unique ID including the generated code. When the unique ID is encrypted, there are merits that it is possible to improve security and it is possible to allow the result value of the generated unique ID to have a constant length. The unique ID generation unit 14 may match the generated unique ID to the recognized RF card 30.

The unique ID transmission unit 15 may transmit the generated unique ID to the service providing server 40. For example, the unique ID transmission unit 15 may transmit the generated unique ID of the RF card 30 to the service providing server 40, and the service providing server 40 may receive the unique ID, and may provide various services to the RF card 30 matched to the unique ID.

Figure 4:
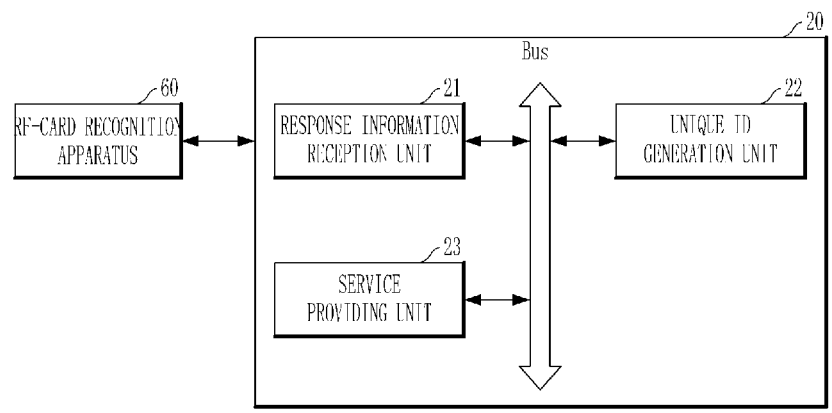
FIG. 4 is a configuration diagram of a unique ID generation server shown in FIG. 2 according to another example embodiment of the present disclosure.

FIG. 4 is a configuration diagram of the unique ID generation server 20 illustrated in FIG. 2 according to the another example embodiment of the present disclosure. Referring to FIG. 4, the unique ID generation server 20 includes a response information reception unit 21, a unique ID generation unit 22, and a service providing unit 23.

The response information reception unit 21 may receive response information of the RF card 30 from the RF-card recognition apparatus 60 that is separately provided. In this case, the response information may be response information corresponding to the plurality of commands defined according to the RF protocol of the RF card 30. The unique ID generation unit 22 may generate the unique ID of the RF card 30 based on the received response information.

Here, the operations of the response information reception unit 21 that receives the response information from the RF-card recognition apparatus 60 that is separately provided and the unique ID generation unit 22 that generates the unique ID are the same as those of the response reception unit 13 and the unique ID generation unit 14 shown in FIG. 3 and are easily analogized by those skilled in the art from the above description, and thus, the description thereof will be omitted.

The service providing unit 23 may execute a service process corresponding to the RF card based on the generated unique ID.

For example, the service process executed by the service providing unit 23 is to store the unique ID generated by the unique ID generation unit 22, user identification information transmitted from the terminal 50 of the store, and service information associated with the user information in a database, to inquiry the service information associated with the user identification information through the terminal 50 of the user and the terminal 50 of the store, and to provide the user service information to the terminal 50 of the user by using a method such as a SMS (Short Message Service), a MMS (Multimedia Message Service), a SNS (Social Network Service), or an E-mail, when necessary. In this case, the user identification information may include telephone number information or ID and password information for log in, and the service information associated with the user may include information such as a mileage, point reserve, an available discount coupon, and a free-use coupon.

As still another example, the service process may newly generate user account information that uses the unique ID of the RF card 30 generated by the unique ID generation unit 22 as an identifier, may generate and store a predetermined random number for associating the unique ID with the user account information, may notify that the RF card 30 is a card which is registered for the first time to the terminal 50 of the store, may receive the user information including the telephone number and the E-mail information of the user from the terminal 50 of the store, may transmit the previously generated predetermined random number and a notice related to registration guide to the terminal 50 of the user based on the received telephone number information of the user, may receive reserve information and use information of the mileage from the terminal 50 of the store, and may update the mileage information. The generated predetermined random number and the notice related to the registration guide may be transmitted through an E-mail based on the received E-mail information of the user.

Various services and service processes related to the services may be further present in addition to the aforementioned examples.

Figure 5:
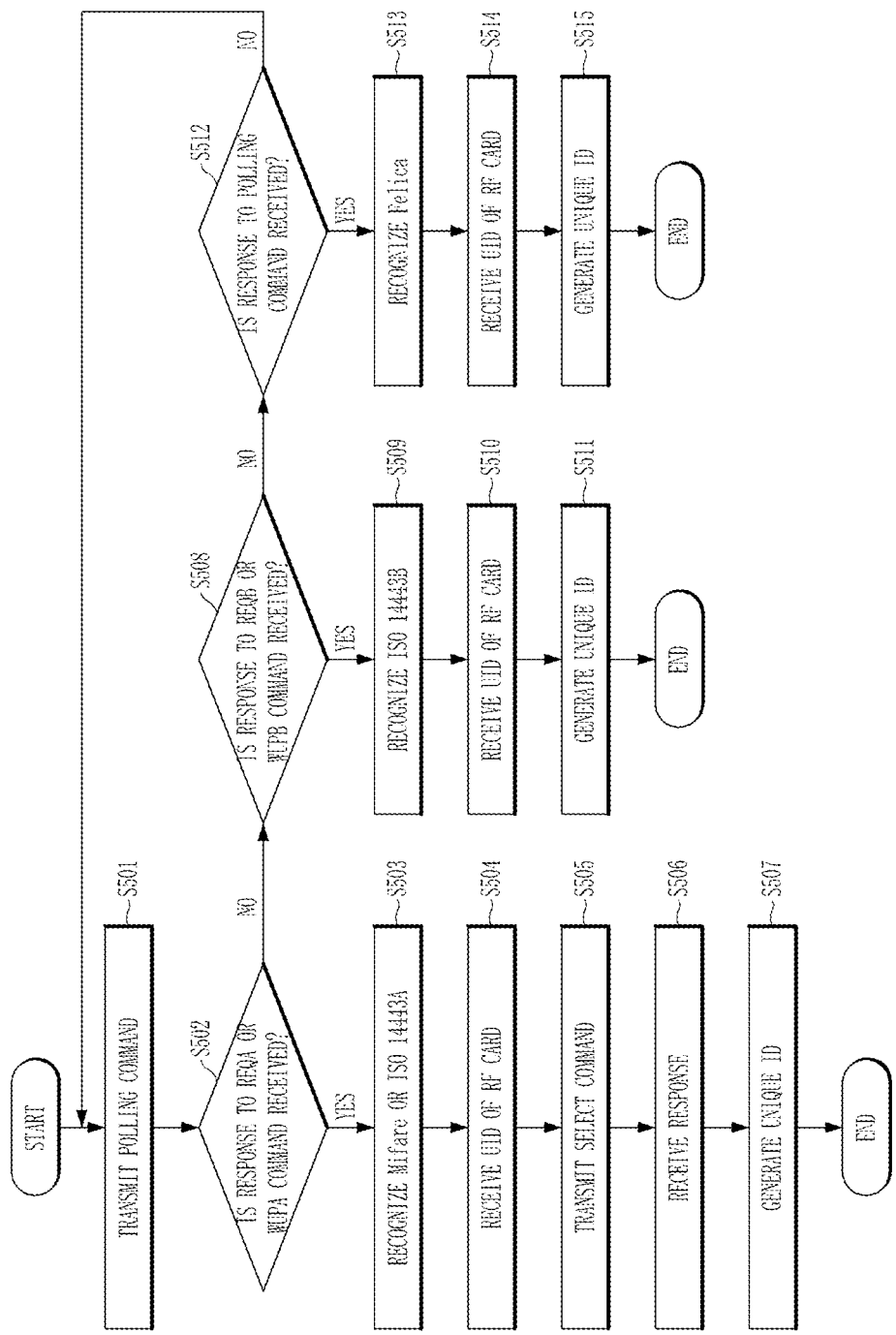
FIG. 5 is a flowchart showing a process of generating a unique ID according to an example embodiment of the present disclosure.

FIG. 5 is a flowchart showing a process of generating a unique ID according to an example embodiment of the present disclosure. Referring to FIG. 5, the unique ID generation apparatus 10 repeatedly transmits the polling commands corresponding to the plurality of protocols for detecting the RF card 30 (S501). When receiving the ATQA as the response to the REQA or WUPA command from the RF card 30 (S502), the unique ID generation apparatus recognizes that the RF card 30 uses the Mifare protocol or the ISO 14443 Type A protocol (S503), transmits the ANTICOLLISION command to the recognized RF card, receives the UID (S504), transmits the SELECT command (S505), and receives the SAK as the response to the transmitted command (S506). The unique ID generation apparatus generates the unique ID of the RF card 30 by combining the received ATQA, UID and SAK (S507).

When receiving the ATQB as the response to the REQB or WUPB command from the RF card 30 (S508), the unique ID generation apparatus recognizes that the RF card 30 uses the ISO 14443 Type B protocol (S509), transmits the ANTICOLLISION command to the recognized RF card 30, receives the UID (S510), and generates the unique ID of the RF card 30 by combining the received ATQB and UID (S511).

When receiving the response to the Polling command from the RF card 30 (S512), the unique ID generation apparatus recognizes that the RF card 30 uses the Felica protocol (S513), and receives the UID of the recognized RF card 30 (S514). The unique ID generation apparatus generates the unique ID of the RF card by combining the response to the Polling command and the received UID (S515).

Table 1 shows an example of a plurality of parts of the generated unique ID of the RF card 30.

Table 1

TABLE 1

| Configuration of Unique ID | Mifare protocol | ISO 14443 Type A protocol | Mifare + ISO 14443 Type A protocol | ISO 14443 Type B protocol | Felica protocol |
| --- | --- | --- | --- | --- | --- |
| First part | Identification code A when responding to REQA or WUPA command | Identification code A when responding to REQA or WUPA command | Identification code A when responding to REQA or WUPA command | Identification code B when responding to REQB or WUPB command | Identification code C when responding to Polling command |

TABLE 1-continued

| Configuration of Unique ID | Mifare protocol | ISO 14443 Type A protocol | Mifare + ISO 14443 Type A protocol | ISO 14443 Type B protocol | Felica protocol |
|---|---|---|---|---|---|
| Second part | UID (4 Bytes, 7 Bytes, or 10 Bytes) | UID (4 Bytes, 7 Bytes, or 10 Bytes) | UID (4 Bytes, 7 Bytes, or 10 Bytes) | UID (PUIP + Application data + Protocol Infor) | UID (IDm + PMm) |
| Third part | SAK (1 byte) = 08 h | SAK (1 byte) = 20 h | SAK (1 byte) = 28 h | N/A (null) | N/A (null) |
| Fourth part | N/A (null) | ATS value | ATS value | N/A (null) | N/A (null) |
| Fifth part | N/A (null) | Response data to APDU command | Response data to APDU command | Response data to APDU command | N/A (null) |

Referring to Table 1, the generated unique ID of the RF card 30 may include combinations of predetermined responses corresponding to the plurality of protocols. For example, the unique ID of the RF card 30 that supports the ISO 14443 Type A protocol may include the first part to the fifth part. The first part may be a predetermined identification code (for example, 001 or 0011) when the ATQA as the response to the REQA or WUPA command is received, the second part may be the UID as the response to the ANTICOLLISION command, the third part may be the SAK having a value of 20 h as the response to the SELECT command, the fourth part may be a value of the ATS as the response to the RATS command, and the fifth part may be response data to a GETDATA command which is a kind of APDU command. However, the first to fifth parts are not limited to Table 1 of the present disclosure. That is, according to various example embodiments of the present disclosure, the content of Table 1 may be differently determined. For example, according to an example embodiment of the present disclosure, when the RF card is manufactured by a certain card manufacturer, the SAK of the third part may be determined to have a value of 88 h in the Mifare protocol. As another example, according to an example embodiment of the present disclosure, the UID of the second part may have any one of 4, 8 or 12 Bytes in the Mifare protocol depending on a Tag value when the UID includes the Tag value.

The example embodiment described with reference to FIG. 5 is merely an example embodiment in which the unique ID of the RF card 30 is generated, and the present disclosure is not limited thereto.

Figure 6:
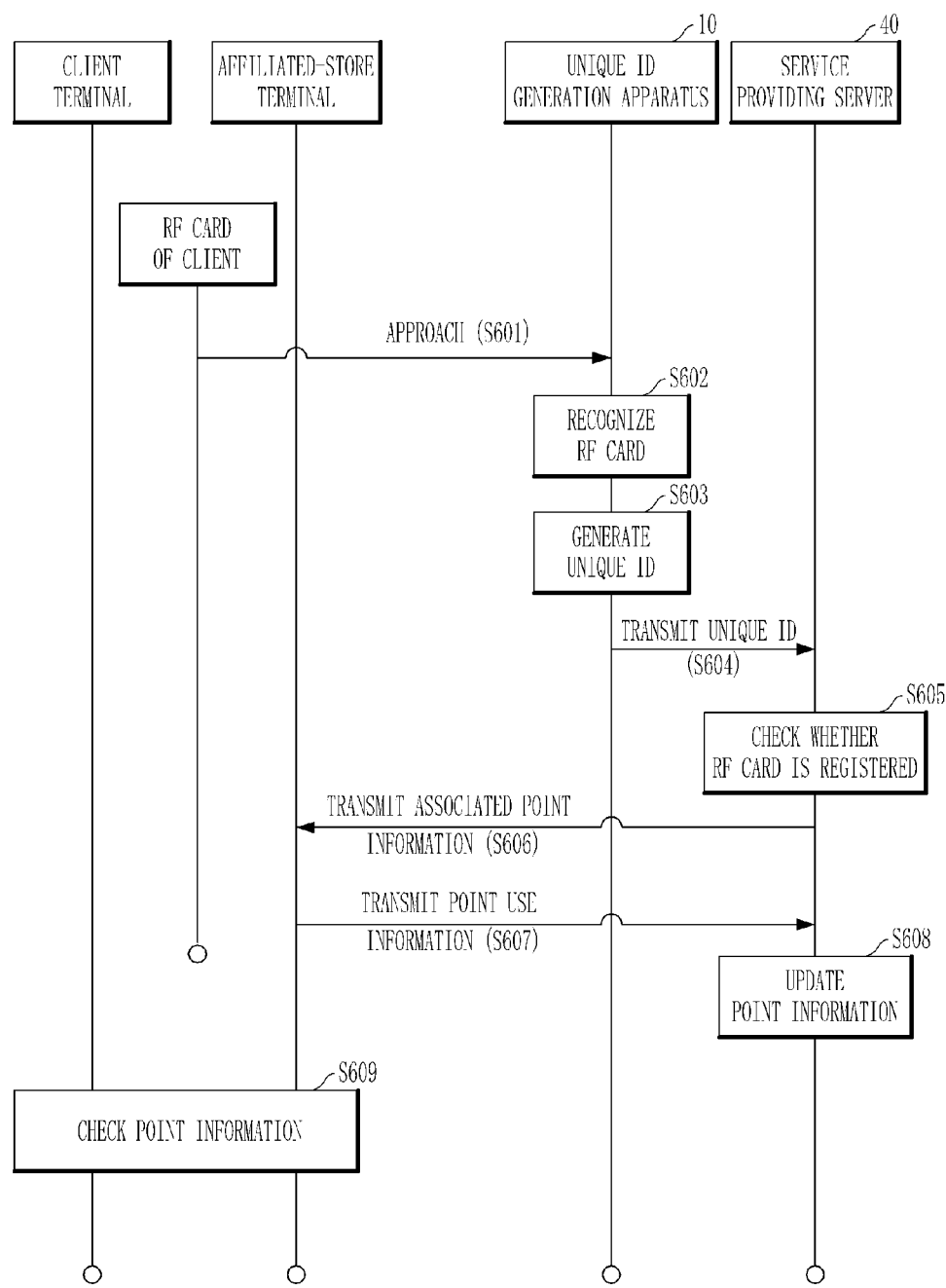
FIG. 6 is a diagram showing a process of providing a service according to an example embodiment of the present disclosure.

FIG. 6 is a diagram showing a process of providing a service according to an example embodiment of the present disclosure. Referring to FIG. 6, when the RF card 30 of a client approaches the unique ID generation apparatus 10 (S601), the unique ID generation apparatus 10 recognizes the approached RF card 30 (S602), generates the unique ID of the recognized RF card 30 (S603), and transmits the generated unique ID to the service providing server 40 (S604). The service providing server 40 checks whether or not the RF card 30 matching the received unique ID is registered (S605), transmits point information associated with the RF card 30 to the terminal 50 of the affiliated store when the RF card 30 is registered (S606), and receives point use information from the terminal 50 of the affiliated store (S607). The service providing server 40 updates the point information of the RF card 30 based on the received point use information (S608), and checks the updated point information through the terminal 50 of the client and the terminal 50 of the affiliated store (S609).

The example embodiment illustrated in FIG. 6 is an example embodiment of the service that uses the RF card 30, and the present disclosure is not interpreted as being limited to the example embodiment illustrated in FIG. 6.

Figure 7:
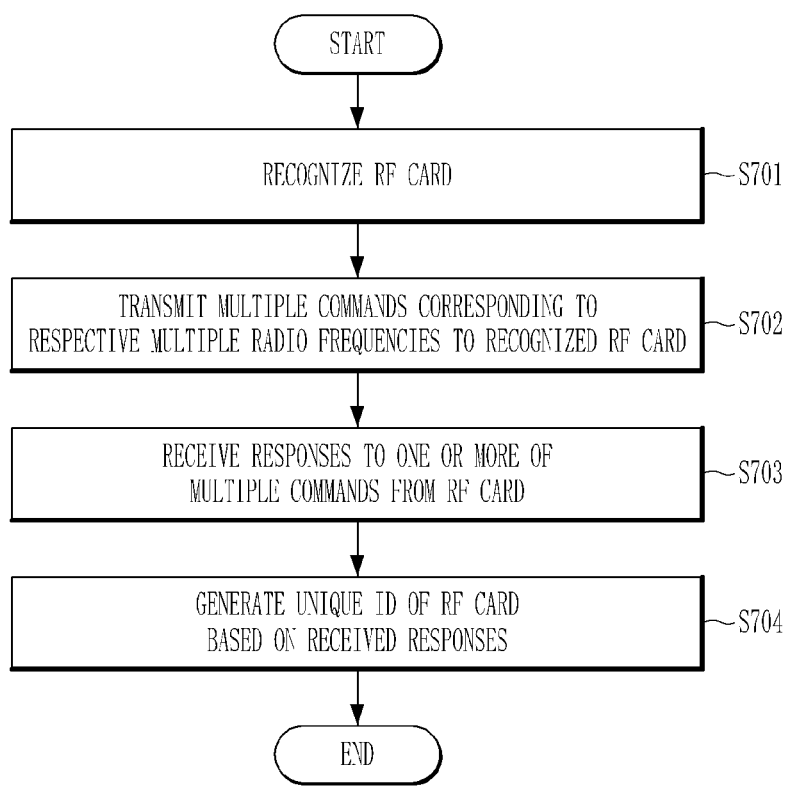
FIG. 7 is an operation flow chart showing a method for generating a unique ID according to an example embodiment of the present disclosure.

FIG. 7 is an operation flowchart showing a method for generating a unique ID according to an example embodiment of the present disclosure. The method for generating a unique ID according to the example embodiment illustrated in FIG. 7 includes steps processed by the unique ID generation apparatus 10 illustrated in FIG. 3 in a sequence of time. Accordingly, even though the description is omitted, the above description of the unique ID generation apparatus 10 illustrated in FIG. 3 is applied to the method for generating a unique ID according to the example embodiment illustrated in FIG. 7.

Referring to FIG. 7, according to an identification information generating method for generating identification information of the RF card 30, the RF card is recognized (S701), the plurality of commands which respectively corresponds to a plurality of RF protocols is transmitted to the recognized RF card 30 (S702), the responses to at least one or more commands of the plurality of commands are received from the RF card 30 (S703), and the unique ID of the RF card 30 is generated based on the received responses (S704).

The method for generating a unique ID according to the example embodiment described with reference to FIG. 7 may be realized in the form of a recording medium including commands that can be executed by a computer such as program modules executed by the computer. The computer readable medium may be any available medium that can be accessed by the computer, and may include volatile and non-volatile media, and detachable and non-detachable media. The computer readable medium may include a computer storage medium and a communication medium. The computer storage medium may include detachable and non-detachable media and volatile and non-volatile media realized by any method or technology for storing information such as a computer readable command, a data structure, a program module or other data. The communication medium includes a computer readable command, a data structure, a program module, other data of a modulated data signal such as a carrier wave, or other transmission mechanisms, and includes any information transmission medium.

Figure 8:
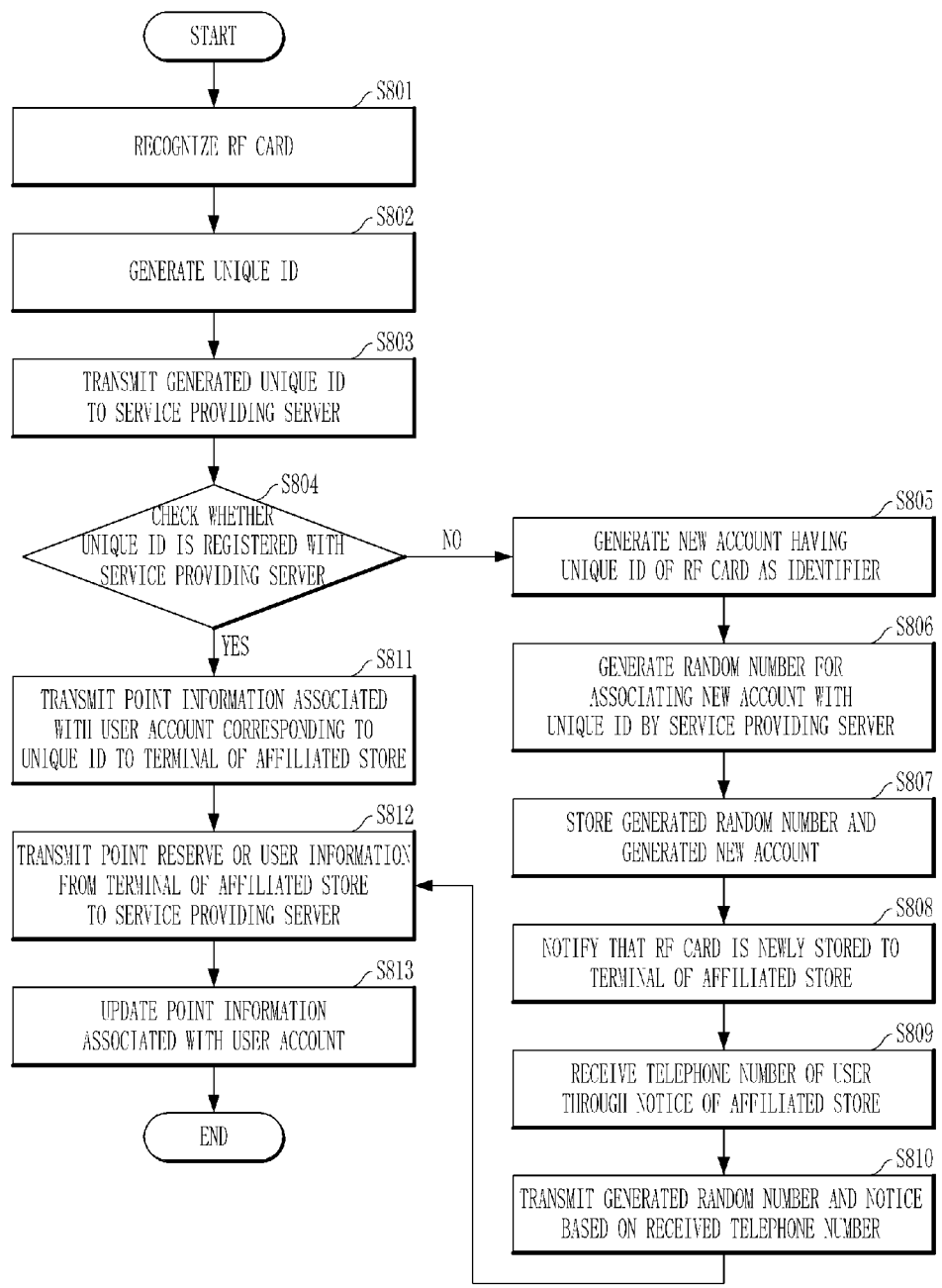
FIG. 8 is an operation flow chart showing a process of providing a service according to an example embodiment of the present disclosure.

FIG. 8 is an operation flowchart showing a process of providing a service according to an example embodiment of the present disclosure. Referring to FIG. 8, the user positions the RF card 30 of the user within a distance capable of communicating with the unique ID generation apparatus 10 connected to the terminal of the affiliated store, and the unique ID generation apparatus 10 recognizes the RF card 30 (S801).

The unique ID generation apparatus 10 generates the unique ID that ensures the uniqueness of the recognized RF card 30 (S802), and transmits the generated unique ID to the service providing server 40 (S803). The service providing server 40 determines whether or not the received unique ID has been registered (S804), and generates a new account of the user having the unique ID of the RF card 30 as an identifier when the unique ID has not been registered (S805). The service providing server 40 generates a random number for associating the unique ID with the newly generated account (S806), and stores the generated random number and the generated account information (S807). Thereafter, the service providing server notifies that the RF card 30 is newly stored to the terminal of the affiliated store (S808), and receives the user information including telephone number information and the E-mail information of the user through the terminal of the affiliated store (S809). The service providing server (40) transmits the previously generated random number based on the received telephone number information and a notice including a guide of a web service URL (Uniform Resource Locator) or a guide of a certain application service (S810). The notice may be transmitted through an E-mail based on the received E-mail information.

When the unique ID has been registered, the service providing server 40 transmits the point information including the mileage associated with the user account corresponding to the unique ID to the terminal of the affiliated store (S811), and the service providing server 40 receives the reserve or use information of the point transmitted from the terminal of the affiliated store (S812). The service providing server 40 updates the point information associated with the user account (S813).

When the user account is registered, if the user has the terminal that supports NFC, the user may directly generate the unique ID of the RF card 30 through the terminal that supports NFC without using the terminal of the affiliated store, may register the generated unique ID with the service providing server 40, and may use the service.

However, the present disclosure is not interpreted as being limited to the example embodiment illustrated in FIG. 8, and the service may be provided to the user through various example embodiments.

Figure 9:
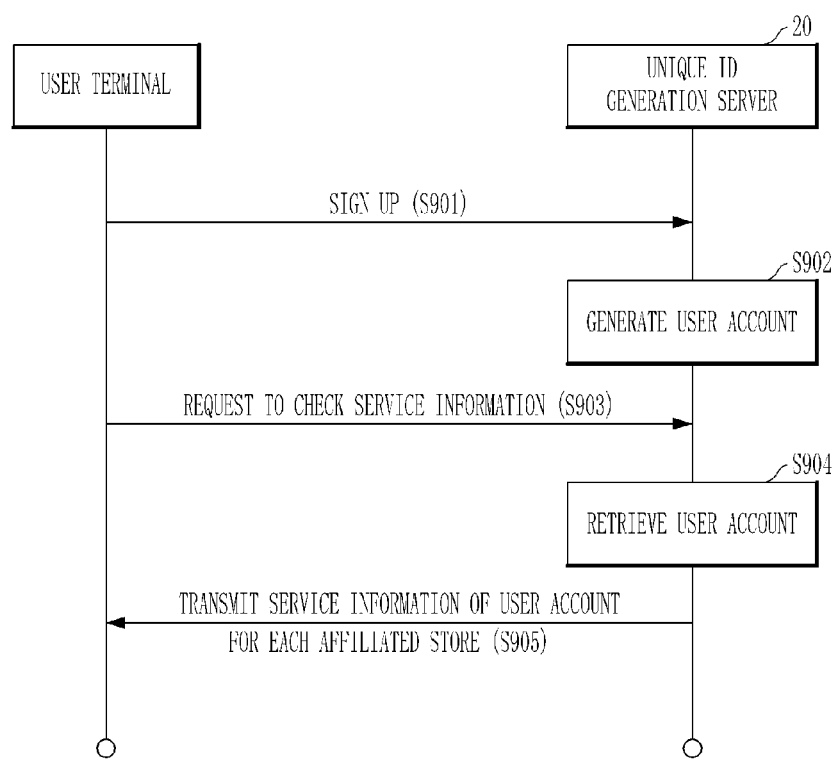
FIG. 9 is a diagram showing a process of inquiring a service according to an example embodiment of the present disclosure.

FIG. 9 is a diagram showing a process of inquiring a service according to an example embodiment of the present disclosure. Referring to FIG. 9, the user signs up for the unique ID generation server 20 through the terminal of the user (S901). The signing up may be performed by inputting the user information including the telephone number information and the E-mail information of the user through a PC or a mobile terminal of the user. Alternatively, when the user has the terminal that supports NFC, the signing up may be performed by directly generating the unique ID of the RF card 30 through the terminal that supports NFC and registering the generated unique ID with the unique ID generation server 20.

The unique ID generation server 20 generates the user account based on the input information (S902). Subsequently, when the user requests of the unique ID generation server 20 to check service information including a mileage and a coupon (S903), the unique ID generation server 20 retrieves the user account (S904), and transmits service information for each affiliated store included in the user account to the terminal of the user (S905).

However, the present disclosure is not interpreted as being limited to the example embodiment illustrated in FIG. 9.

The above description of the present disclosure is an example only, and it should be understood to those skilled in the art that the example embodiments are easily modified in different specific forms without changing the essential feature or the technical ideals of the present disclosure. Therefore, it should be understood that the example embodiments described above are meant to be illustrative not restrictive. For example, the respective components described as singular forms may be implemented by being distributed, and the respective components described as being distributed may be implemented by being coupled.

The scope of the present disclosure is defined by the appended claims rather than the detailed description, and it should be interpreted that all modifications derived from the meaning and scope of the claims and equivalents thereto or modified forms are included in the scope of the present disclosure.

We claim:

1. A unique ID generation apparatus that generates a unique ID of a radio frequency (RF) card, the apparatus comprising:
   a card recognition unit configured to recognize an RF card;
   a command transmission unit configured to transmit, to the recognized RF card, a plurality of commands which respectively correspond to a plurality of RF protocols, wherein the command transmission unit transmits a first command corresponding to a first RF protocol to the RF card, and a second command corresponding to a second RF protocol to the RF card;
   a response reception unit configured to receive, from the RF card, a first response to the first command and a second response to the second command; and
   a unique ID generation unit configured to generate a unique ID of the RF card based on a received response, wherein the unique ID generation unit generates an ID corresponding to the first RF protocol as the unique ID of the RF card, when the first response is received, and generates an ID corresponding to the second RF protocol as the unique ID of the RF card, when the second response is received.

2. The unique ID generation apparatus of claim 1,
   wherein the first command includes a first type command and the second command includes a second type command, and
   wherein the first response includes a response to the first type command and the second response includes a response to the second type command.

3. The unique ID generation apparatus of claim 2,
   wherein the first type command includes a polling command, and the second type command includes a SELECT command.

4. The unique ID generation apparatus of claim 1,
   wherein the first command includes a first polling command, and the second command includes a second polling command.

5. The unique ID generation apparatus of claim 4,
   wherein the unique ID generation unit is further configured to determine a first part of the unique ID by using a response to one of the first polling command and the second polling command, determine a second part of the unique ID based on a response to a SELECT command, and generate the unique ID based on a combination of the determined first part and the determined second part.

6. The unique ID generation apparatus of claim 4,
   wherein the first polling command is one or more of a REQA (REQuest A) command and a WUPA (Wake-UP A) command, and
   the second polling command is one or more of a REQB (REQuest B) command and a WUPB (Wake-UP B) command.

7. The unique ID generation apparatus of claim 4,
wherein when the response reception unit is further configured to receive a response to the first polling command, and the command transmission unit is further configured to transmit a SELECT command to the RF card.

8. The unique ID generation apparatus of claim 1,
wherein the first command includes a REQA (REQuest A) command, and a WUPA (Wake-UP A) command, and the second command includes a REQB (REQuest B) command, a WUPB (Wake-UP B) command, and a polling command, and
wherein the command transmission unit is further configured to transmit a SELECT command to the RF card when the response reception unit receives a response to the REQA (REQuest A) command or a response to the WUPA (Wake-UP A) command.

9. The unique ID generation apparatus of claim 1,
wherein the response reception unit is further configured to receive an ID of the RF card, which is given in a process of manufacturing the recognized RF card, and
wherein the unique ID generation unit is further configured to generate the unique ID of the RF card based on the received responses and the received ID.

10. The unique ID generation apparatus of claim 1,
wherein the unique ID generation unit is further configured to generate a code by combining responses received by the response reception unit, the code including one or more numbers or characters as the unique ID that recognizes the RF card.

11. The unique ID generation apparatus of claim 10,
wherein the unique ID generation unit is further configured to encrypt the generated code.

12. The unique ID generation apparatus of claim 1,
wherein the unique ID generation unit is further configured to match the generated unique ID to the recognized RF card.

13. The unique ID generation apparatus of claim 1, further comprising:
a unique ID transmission unit configured to transmit the generated unique ID to a service providing server.

14. An identification information generating method of generating a unique ID of a radio frequency (RF) card, the method comprising:
recognizing an RF card;
transmitting, to the recognized RF card, a plurality of commands which respectively correspond to a plurality of RF protocols, wherein the plurality of the commands includes a first command corresponding to a first RF protocol, and a second command corresponding to a second RF protocol;
receiving, from the RF card, a first response to the first command and a second response to the second command; and
generating a unique ID of the RF card based on a received response, wherein the unique ID includes an ID corresponding to the first RF protocol as the unique ID of the RF card, when the first response is received, and an ID corresponding to the second RF protocol as the unique ID of the RF card, when the second response is received.

15. A unique ID generation apparatus that generates a unique ID of a radio frequency (RF) card, the apparatus comprising:
a card recognition unit configured to recognize an RF card;
a command transmission unit configured to transmit, to the recognized RF card, a plurality of commands which respectively correspond to a plurality of RF protocols, wherein the command transmission unit transmits a first command corresponding to a first RF protocol to the RF card, and a second command corresponding to a second RF protocol to the RF card;
a response information reception unit configured to receive, from the RF card, a first response to the first command and a second response to the second command;
a unique ID generation unit configured to generate a unique ID of the RF card based on a received response, wherein the unique ID generation unit generates an ID corresponding to the first RF protocol as the unique ID of the RF card, when the first response is received, and generates an ID corresponding to the second RF protocol as the unique ID of the RF card, when the second response is received; and
a service providing unit that executes a service process corresponding to the RF card based on the generated unique ID.

* * * * *